United States Patent

Sucke

(10) Patent No.: US 6,648,214 B1
(45) Date of Patent: Nov. 18, 2003

(54) METHOD FOR PARTIALLY OR COMPLETELY COATING THE SURFACES OF COMPONENTS PRODUCED FROM ALUMINUM OR ITS ALLOYS WITH SOLDERS, FLUXING AGENTS OR BINDERS FOR BRAZING

(75) Inventor: Norbert-William Sucke, Duisburg (DE)

(73) Assignee: Erbslöh AG, Velbert (DE)

( * ) Notice: Subject to any disclaimer, the term of this patent is extended or adjusted under 35 U.S.C. 154(b) by 0 days.

(21) Appl. No.: 09/868,053

(22) PCT Filed: Dec. 11, 1999

(86) PCT No.: PCT/EP99/09835

§ 371 (c)(1),
(2), (4) Date: Jun. 13, 2001

(87) PCT Pub. No.: WO00/38874

PCT Pub. Date: Jul. 6, 2000

(30) Foreign Application Priority Data

Dec. 23, 1998 (DE) .......................................... 198 59 735

(51) Int. Cl.⁷ ........................ B23K 31/00; B23K 31/02; B23K 35/34
(52) U.S. Cl. ............................ 228/248.1; 228/180.22; 228/56.1; 228/262.5; 228/262.51; 148/22; 148/23; 148/24
(58) Field of Search .................. 228/248.1, 56.1, 228/51, 262.5, 262.51; 148/22–24

(56) References Cited

U.S. PATENT DOCUMENTS

| | | | | |
|---|---|---|---|---|
| 4,505,946 A | * | 3/1985 | Suzuki et al. ............... | 427/185 |
| 4,664,309 A | * | 5/1987 | Allen et al. ............ | 228/180.22 |
| 4,997,674 A | * | 3/1991 | Parr et al. .................... | 427/123 |
| 5,147,471 A | * | 9/1992 | Kronberg ..................... | 148/22 |
| 5,232,788 A | * | 8/1993 | Timsit et al. ............... | 228/56.3 |
| 5,316,863 A | * | 5/1994 | Johnson et al. ............. | 427/185 |
| 5,690,271 A | * | 11/1997 | Dudel ........................ | 106/491 |
| 5,820,939 A | * | 10/1998 | Popoola et al. ........ | 219/145.22 |
| 5,856,378 A | * | 1/1999 | Ring et al. .................. | 428/407 |
| 5,907,761 A | * | 5/1999 | Tohma et al. ................. | 148/24 |
| 5,935,514 A | * | 8/1999 | Ford et al. .................. | 428/407 |
| 5,965,197 A | * | 10/1999 | Jin et al. ............... | 427/255.25 |
| 6,113,667 A | * | 9/2000 | Hyogo et al. ................. | 148/23 |
| 6,153,021 A | * | 11/2000 | Suzuki et al. ................. | 148/22 |
| 6,203,628 B1 | * | 3/2001 | Katoh et al. .................. | 148/23 |
| 6,258,733 B1 | * | 7/2001 | Solayappan et al. ... | 427/255.25 |
| 6,291,624 B1 | * | 9/2001 | Ardaud et al. .............. | 525/440 |
| 6,344,237 B1 | * | 2/2002 | Kilmer et al. .............. | 427/190 |
| 6,350,495 B1 | * | 2/2002 | Schriener et al. ........... | 106/491 |

FOREIGN PATENT DOCUMENTS

| | | |
|---|---|---|
| DE | 197 44 734 A1 | 4/1999 |
| EP | 0563750 | 10/1993 |
| FR | 2479055 | 10/1981 |
| FR | 2496518 | 6/1982 |

* cited by examiner

Primary Examiner—M. Alexandra Elve
Assistant Examiner—L. Edmondson
(74) Attorney, Agent, or Firm—Friedrich Kueffner

(57) ABSTRACT

In a method for partial or complete coating of surfaces of components of aluminum and its alloys with a uniform layer of homogeneously distributed solder, fluxing agent and binder for brazing of the components to one another, the solder, fluxing agent and binder are applied in powder form at high speeds up to 180 m/min onto the surfaces provided for brazing by electrostatic powder coating. The powder particles have a particle size of 5 to 30 μm. The proportion of binder relative to the total quantity of powder is smaller than 35% by weight. The uniform layer of homogeneously distributed solder, fluxing agent and binder has only a thickness of less than 50 μm. Heat is used melting this layer.

25 Claims, 1 Drawing Sheet

METHOD FOR PARTIALLY OR COMPLETELY COATING THE SURFACES OF COMPONENTS PRODUCED FROM ALUMINUM OR ITS ALLOYS WITH SOLDERS, FLUXING AGENTS OR BINDERS FOR BRAZING

BACKGROUND OF THE INVENTION

1. Field of the Invention

The invention relates to a method for partially or completely coating the surfaces of components produced from aluminum or its alloys with solders, fluxing agents or binders for brazing the components to one another, wherein solder, fluxing agents and binders are applied at high speed onto the surfaces provided for brazing, wherein heat is used for melting them.

2. Discussion of the Related Art

The German patent application with the Serial No. 197 44 743.1-45 describes a method of the aforementioned kind wherein the solder and the fluxing agent are applied in a powder form at high speed for a uniformly metered coating of the surface of metal components while the binder is applied in a liquid or at least pasty form in a limited way onto the surface of the metal components. In this known solution a coating that adheres well is obtained which makes possible further processing steps. For reasons of economic efficiency a high coating speed should be aimed for so that an integration into already existing processes is made possible. However, the limited binder application requires also a relatively large amount of binder for a sufficient adhesion of the fluxing agent and solder in powder form, relative to a surface, and, moreover, solvent emissions of the binder as well as waste material result with which disposal costs are incurred.

SUMMARY OF THE INVENTION

This is the starting point of the invention whose object it is to improve the aforementioned method such that for obtaining a good soldering result with a coating as uniform as possible the applied layer containing solder, fluxing agents and binders can be produced with the smallest possible quantities of these materials. This object is solved according to the invention in that in addition to the solder and fluxing agents in powder form the binder is also applied in powder form. This application of solder, fluxing agent and binder onto the surface of the components of aluminum and its alloys is carried out advantageously by an electrostatic powder coating process. For this purpose, two methods can be advantageously employed wherein, on the one hand, the triboelectric chargeability of the powder components or, on the other hand, the ion-depleted corona charge of the powder components can be used. These powder components of solder, fluxing agent and binder in powder form can be applied as individual components by means of a pistol onto the surface of the component. The application of the solder, fluxing agent and binder by means of a pistol can be carried out even when these materials have been previously transferred into the form of a co-extruded material and in this way a powder mixture of solder, fluxing agent and binder is formed. In this connection, the co-extruded material can be applied in an especially environmentally safe and economical way in an electrostatic fluidized chamber or in a fluidized bed.

The application in an electrostatic fluidized chamber or a fluidized bed can be performed also with solder, fluxing agent and binder in powder form when these materials are present as individual components in powder form. A further possibility of application in an electrostatic fluidized chamber or a fluidized bed resides in that the solder, fluxing agent and binder in powder form are applied in the form of a powder mixture.

In addition to the aforementioned application methods a magnetic brush is also suitable for applying the solder, fluxing agent, and binder in the form of a coextruded material onto the surface of a component of aluminum and its alloys.

The aforementioned process possibilities of powder coating by means of pistol, fluidized chamber or magnetic brush make possible coating speeds of up to 180 m/min. Moreover, the coating variants by means of electrostatic fluidized chamber or magnetic brush have the advantages of an especially uniform coating while, when using pistols, a slight pulsation of the powder flow can occur.

In this connection it is also possible that, in addition to the three aforementioned components of solder, fluxing agent and binder, also functional additives for wear protection and corrosion protection can be added which can also be applied in a powder form. The functional additives are, for example, carbides for wear protection and, for example, zinc for corrosion protection.

For forming a uniform layer of solder, fluxing agent, and binder, the powder application onto the surface of the component must be subjected to heat whose temperature range may be 80° C. up to approximately 350° C. This can be achieved, for example, in that the processing heat generated during the extrusion process in the component can be used for an application process which directly follows the extrusion process as the heat for melting of the layer of solder, fluxing agent and binder to be applied to the component. However, when before powder coating of the component the component has cooled, the heat for melting of the layer of solder, fluxing agent and binder applied in powder form is to be applied advantageously to the component directly before or even after the powder coating process.

For after treatment with respect to a surface sealing and optionally also smoothing of the melted layer of solder, fluxing agent, and binder, this layer can be supplied with heat in a further method step. This can be realized by heat radiation or also in the case of an additional smoothing by heated rolls which are pressed against the surface of the coated component. Optionally, within the context of the after treatment, a parting agent can also be applied onto the sealed layer in order to prevent adhesion during further processing, for example, by coiling thin-walled components. The parting agent can be, for example, oil. For controlling the powder application with respect to the layer thickness to be built up and its consistency as well as for controlling the heat supply, the after-treated melted layer of solder, fluxing agent and binder preferably passes through a measuring station which inputs data into a control circuit for controlling the coating process.

Downstream of the measuring station, the coated component advantageously passes through a cooling device with which these coated components can be brought to a temperature suitable for further processing, for example, by cutting, straightening, coiling, for their storage and the like.

For the brazing step, the application of, in particular, a very thin layer of solder powder, fluxing agent powder, and binder powder onto the component surface is sufficient, wherein the layer thickness is less than 30 $\mu$, preferably 15 $\mu$m. For this purpose, it is sufficient to apply an amount of binder powder onto the component surface for brazing which is 3 to 10 g/m², preferably however 4 g/m².

As the reaction mixture for performing the method, solder, fluxing agent and binder available in powder form are suitable. The powder particles are always present within a distribution range. For example, powder particles of a size of 3 to 50 µm may be present in the distribution range. The average of the distribution of the powder particle size should be 3 to 30 µm, preferably 10 to 15 µm. The binder in powder form is advantageously a fine-grain organic binder—in the following referred to as clear lacquer powder—while the solder powder is in the form of aluminum-containing metal powder, in particular, a metal or alloy powder containing Al—Si, preferably Al—Si(7–40) alloy powder. However, it is also possible to use as a solder powder a silicon powder or zinc powder. The fluxing agent is advantageously a non-corrosive fluxing agent on the basis of metal fluorides, in particular, alkali metal fluoride and/or zinc fluoride.

For forming the reaction mixture in powder form the weight ratio of solder powder to the fluxing agent powder is also important. In this connection, the weight ratio of solder powder to fluxing agent powder is 1:1 to 1:3 wherein, however, preferably a weight ratio of 1:1 is provided. Furthermore, for the formation of the reaction mixture the percent by weight proportion of binder in the form of clear lacquer powder, relative to the total amount of powder of solder, fluxing agent and binder, is important, wherein preferably the binder contains 25% by weight clear lacquer powder, relative to the total weight of the powder.

With respect to the aforementioned coextrusion powder, it should be noted also that the formation of such a coextruded powder of solder, fluxing agent and binder is beneficial inasmuch as no separation of the components will occur. This co-extruded powder can be formed by grinding a granular material which is obtained by extrusion of a mixture of solder, fluxing agent and binder wherein the coextruded powder particles have a uniform particle size distribution.

BRIEF DESCRIPTION OF THE DRAWINGS

The process for coating the surfaces of the components of aluminum and its alloys is explained in more detail with the aid of two methods schematically illustrated as examples in the drawing. It is shown in.

DESCRIPTION OF THE PREFERRED EMBODIMENTS

Figure 1:
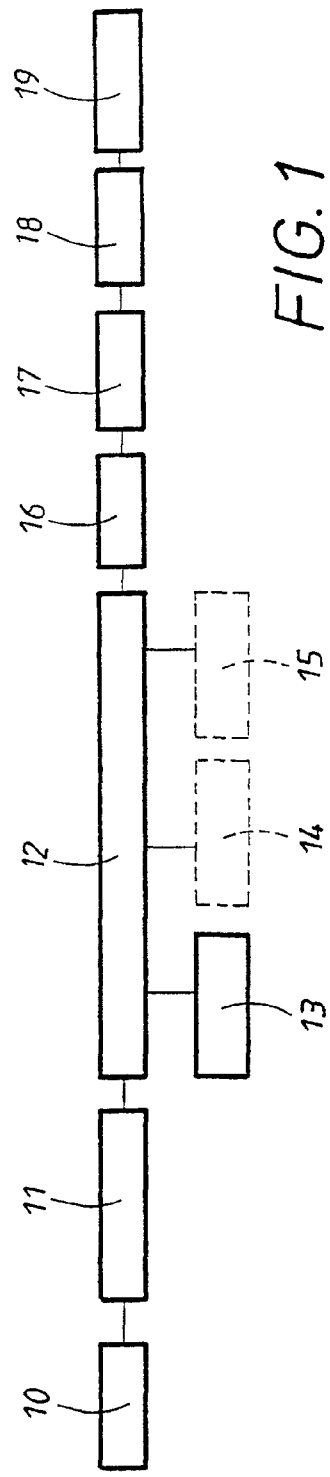
FIG. 1 a schematically illustrated method by way of a block diagram in which the components are pre-heated, for example, exiting in the hot state from an extrusion press, and are subjected to the coating process.

In the method illustrated in FIG. 1, the component 10 of aluminum and its alloys in the form of a strip, pipe, profiled section or the like exits directly an extrusion press and is checked in a heating station 11 with respect to whether the processing heat contained in the component is sufficient for melting the subsequent powder coating. This heating station 11 is suitable to control the component to a temperature which is greater than 800° C. In this connection, the heating station can be operated by induction heating, burner heating, or radiation heating. Downstream of the heating station 11, a powder coating station 12 for electrostatic powder coating is provided through which the component 10 passes and onto whose surface solder powder, fluxing agent powder and binder powder are applied. These individual powder substances can be applied as individual components by means of a pistol and removed separately from separate powder containers 13, 14, 15. Instead of the powder substances of solder, fluxing agent and binder being applied as individual components, the substances can also be applied in the form of a co-extruded material by means of a pistol from a single powder container 13. The powder coating station can also be configured as a fluidized chamber or fluidized bed wherein the solder, fluxing agent, and binder are applied in the form of individual powder components or in the form of a powder mixture or also in the form of a coextruded material onto the surface of the component. Finally, it is also possible to apply the solder, fluxing agent and binder in the form of a coextruded material by means of the magnetic brush method in the powder coating station 12. The powder (overspray) which is not deposited can be captured and can be returned into the coating process.

In all situations a very thin layer of solder powder, fluxing powder and binder powder is applied for brazing onto the surface of the components, wherein the layer thickness is approximately 15 µm. In this connection, the quantity proportion of the binder powder in general should be approximately 4 g/m². The size of the powder particles of the solder in powder form, the fluxing agent in powder form, and the binder in powder form is preferably 10 to 15 µm. The binder pyrolyzes with little residue in nitrogen ($N_2$) and air.

In the here described example, a clear lacquer powder can be used as the binder powder while the solder powder is an aluminum-containing metal powder such as, for example, Al—Si or only Si powder. The weight ratio solder powder to fluxing agent powder in the described embodiment is adjusted to approximately 50 to 50% by weight. Relative to the total powder quantity of solder, fluxing agent, and binder, a binder in the form of a clear lacquer powder with a weight proportion of 25% is used in the aforedescribed embodiment.

Subsequent to the powder coating station 12 an after treatment station 16 is arranged in which a surface sealing of the melted powder layer by heat radiation of heatable rolls, gliding skids or the like can be carried out. At the same time, a parting agent can be applied in order to prevent adhesion of the coated surfaces in the case of these surfaces contacting one another.

Downstream of the after treatment station a measuring station 17 is arranged with which the layer thickness and/or layer composition is determined wherein these data are supplied to a control circuit with which control pulses, resulting when values occur that surpass the response limits, are supplied to the powder coating station 12, to the after treatment station 16, and also the heating station 11 for correction of the actual value. For a minimal requirement with regard to uniformness of the coating, the coating device can also be operated by a pure control. Finally, downstream of the measuring station 17 a cooling station 18 is provided which either cools by means of water and subsequent drying or by means of air the coated component to a temperature sufficient for the transport, further processing or storage. To the cooling station 18 a further processing station 19 can be connected in which the strip-shaped components are cut, straightened or wound to a coil.

Figure 2:
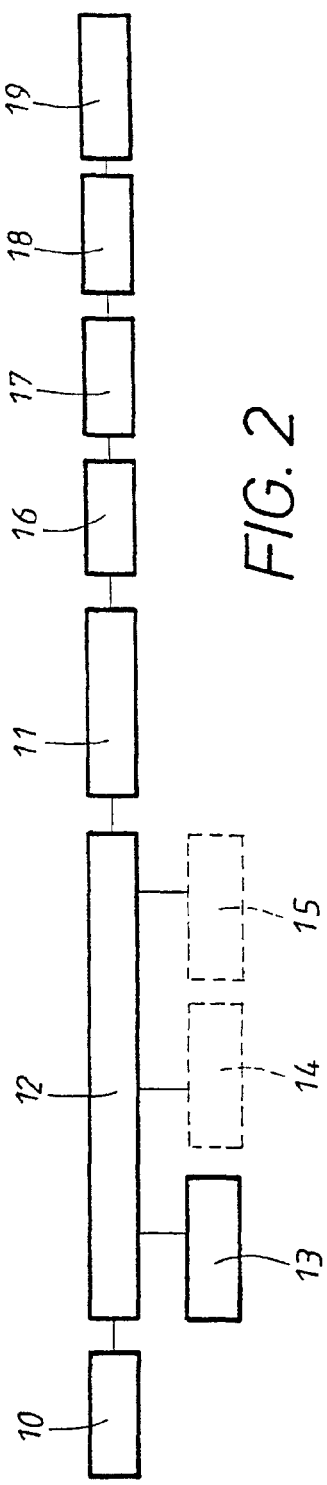
FIG. 2 a method in which the coating process is applied to the cold components and the components are subsequently supplied with heat.

In the method schematic shown in FIG. 2, the strip-shaped components are present optionally at room temperature and are supplied in this state to a powder coating station 12 with corresponding powder containers 13, 14, and 15. These powder coating station 12 can be operated in the same way as has been described above in the method schematic according to FIG. 1. A heating station 11 is arranged so as to adjoin this powder coating station which can be operated by induction heating or by a burner and serves for melting the layer of solder, fluxing agent and binder. Adjoining this heating station, in the same sequence as in the embodiment according to FIG. 1, are the after treatment station 16, the measuring station 17, the cooling station 18, and, finally, optionally also the further processing station 19. In these stations 16 to 19, the same treatment steps as in the method according to FIG. 1 are performed.

For explaining the invention, an embodiment is listed in which four different powder mixtures are prepared of the individual components polyethylene-clear lacquer powder as the binder and Nocolok Sil® as a solder fluxing agent and applied, respectively, to an aluminum heat exchanger profile which is pre-heated to 200° C. An electrostatic application pistol was used for the application in this test series. For production processes the application by means of fluidized chamber for magnetic brush is preferred because, when using pistols, a slight pulsation of the powder flow can influence the coating result.

The powder mixtures differ with regard to their weight proportion of the binder relative to the weight of the total powder mixture. Mixtures with a binder proportion of 25% by weight and 50% by weight are used, respectively. Moreover, these powder mixtures differ with regard to the particle size distribution of the binder powder. Polyethylene clear lacquer powders with an average distribution of the particle size of 36 $\mu$m and 12.4 $\mu$m are used, respectively.

The following table shows the obtained results.

| Powder Mixture | Particle Size D (V, 0.5) | Binder Proportion in % by Weight | Adhesion | Solder Powder Distribution |
| --- | --- | --- | --- | --- |
| 1 | 36 $\mu$m | 25 | bad | non-uniform |
| 2 | 36 $\mu$m | 50 | good | non-uniform |
| 3 | 12.4 $\mu$m | 50 | good | uniform |
| 4 | 12.4 $\mu$m | 25 | good | uniform |

The determination of the adhesion results was carried out by means of bending tests. When using the first powder mixture, the applied layer chipped off the cooled heat exchanger profile during bending. Adhesion was good with the powder mixtures 2–4. The solder powder distribution is important for a good soldering result. When no uniform distribution is present, it can no longer be ensured that sufficient solder for brazing is provided at a future soldering location.

The determination of the solder powder distribution was carried out visually. Coated profiles were graded non-uniform when the solder particles formed islands and clear lacquer zones without soldering particles were present between these particle accumulations.

It can also be taken from the table that binder proportions of 25% by weight and 50% by weight show the same good results.

Experiments with acrylate binder powders result in comparative results of the solder powder distribution.

As already mentioned, the aforementioned method is described only as an example and is not limited in any way only to the described embodiments. Instead several other embodiments and supplements of method are possible. Moreover, all method steps or features mentioned in the description are important for the invention, even if they are not exclusively claimed in the claims.

List of Reference Numerals

10 component
11 heating station
12 powder coating station
13 powder container
14 powder container
15 powder container
16 after treatment station
17 measuring station
18 cooling station
19 further processing station.

What is claimed is:

1. Method for partial or complete coating of surfaces of components of aluminum and its alloys with a uniform layer of homogeneously distributed solder, fluxing agent and binder for brazing of the components to one another,
   wherein solder, fluxing agent and binder are applied in powder form at high speeds up to 180 m/min onto the surfaces provided for brazing by means of electrostatic powder coating,
   wherein the powder particles are present in a particle size of 5 to 30 $\mu$m, preferably 10 to 15 $\mu$m, as well as a narrow particle size distribution with an average distribution of 10 to 15 $\mu$m,
   wherein the proportion of binder relative to the total quantity of powder is smaller than 35% by weight,
   wherein the uniform layer of homogeneously distributed solder, fluxing agent and binder has a layer thickness of less than 50 $\mu$m, preferably 15 $\mu$m, and
   heat is used for melting this layer.

2. Method according to claim 1, wherein for electrostatic powder coating a method is used that utilizes the triboelectric chargeability of the powder components.

3. Method according to claim 1, wherein for electrostatic powder coating a method is used that utilizes the iron-depleted corona charge of the powder components.

4. Method according to claim 1, wherein the solder, fluxing agent and binder are applied in the form of individual components by means of a pistol.

5. Method according to claim 1, wherein the solder, fluxing agent and binder are applied in the form of a coextruded material in powder form by means of a pistol, which coextruded material is formed by manufacture of a coextrusion product of the homogeneous mixture of solder, fluxing agent and binder, subsequent granulation of the coextrusion product to a granular material and grinding of the granular material to a coextruded material in powder form.

6. Method according to claim 1, wherein the solder, fluxing agent and binder are applied in the form of individual powder components in an electrostatic fluidized chamber/a fluidized bed.

7. Method according to claim 1, wherein the solder, fluxing agent and binder are applied in the form of a powder mixture in an electrostatic fluidized chamber/a fluidized bed.

8. Method according to claim 1, wherein the solder, fluxing agent and binder are applied in the form of a coextruded material in powder form in an electrostatic fluidized chamber/a fluidized bed, which coextruded material is formed by manufacture of a coextrusion product of the homogeneous mixture of solder, fluxing agent and binder, subsequent granulation of the coextrusion product to a granular material and grinding of the granular material to a coextruded material in powder form.

9. Method according to claim 1, wherein the solder, fluxing agent and binder are applied in the form of a coextruded material by means of a magnetic brush,
which coextruded material is formed by manufacture of a coextrusion product of the homogeneous mixture of solder, fluxing agent and binder, subsequent granulation of the coextrusion product to a granular material and grinding of the granular material to a coextruded material in powder form.

10. Method according to claim 1, wherein the heat is applied to a heat exchanger component for melting the layer of solder, fluxing agent and binder to be applied directly before the powder coating is carried out.

11. Method according to claim 10, wherein the heat generated by an extrusion process in the heat exchanger component is used as the heat for melting of the layer of solder, fluxing agent and binder to be applied onto the heat exchanger component in a coating process that is carried out directly after the extrusion process.

12. Method according to claim 1, wherein the heat is applied to the component for melting of the applied layer of solder, fluxing agent and binder directly after the power coating process.

13. Method according to claim 1, wherein the melted layer of solder, fluxing agent and binder is subjected to an after treatment for surface sealing and optionally smoothing of the layer with further supply of heat.

14. Method according to claim 1, wherein the coated component passes through a measuring station whose measured data are usable for controlling the powder application with respect to layer thickness, consistency, and heat supply.

15. Method according to claim 1, wherein a cooling device provided with which the coated components are cooled to a temperature suitable for further processing by cutting, straightening, coiling of the components or for their storage.

16. Method according to claim 1, wherein a minimal amount of binder is applied onto the component surface for brazing, in particular, 3 to 10 g/m$^2$, preferably 4 g/m$^2$.

17. Reaction mixture for use in the method according to claim 1, comprising solder in powder form, fluxing agent in powder form and binder in powder form with powder particle sizes of 5 to 30 µm, preferably 10 to 15 µm, wherein the powder particles are present in a narrow particle size distribution with an average distribution of 3 to 30 µm, preferably 10 to 15 pµm, and
wherein the proportion of binder relative to the total weight of powder is less than 35% by weight, preferably 25% by weight.

18. Reaction mixture according to claim 17, wherein the binder powder is an organic binder.

19. Reaction mixture according to claim 17, wherein as a fluxing agent a non-corrosive metal fluoride powder, in particular, an alkali metal fluoride powder and/or zinc fluoride powder is used.

20. Reaction mixture according to claim 17, wherein as the solder powder an aluminum-containing metal powder, such as Al—Si containing metal powder or alloy powder, preferably a supereutectic Al—Si(13–40) alloy powder, is used.

21. Reaction mixture according to claim 17, wherein a silicon powder is used as a solder powder.

22. Reaction mixture according to claim 17, wherein a zinc powder is used as the solder powder.

23. Reaction mixture according to claim 17, wherein a weight ratio of solder powder to fluxing agent powder of 1:1 to 1:3, preferably 1:1, is used.

24. Reaction mixture according to claim 17, wherein, in addition to the solder in powder form, fluxing agent in powder form and binder in powder form, functional additives for wear protection and/or corrosion protection in powder form are used.

25. Reaction mixture for use in the method according to claim 1, comprising a coextruded material powder, which results from grinding a granular material which is obtained by extrusion of a mixture of solder, fluxing agent and binder, wherein the coextruded powder articles are present in particle sizes of 5 to 30 µm, preferably 10 to 15 µm, and are present in a narrow particle size distribution with an average distribution of 3 to 30 µm, preferably 10 to 15 µm, and
wherein the proportion of binder relative to the total weight of powder is less than 35% by weight, preferably 25% by weight.

* * * * *